United States Patent
Gschwind et al.

(10) Patent No.: US 10,747,628 B2
(45) Date of Patent: *Aug. 18, 2020

(54) USING TRANSACTIONAL EXECUTION FOR RELIABILITY AND RECOVERY OF TRANSIENT FAILURES

(71) Applicant: INTERNATIONAL BUSINESS MACHINES CORPORATION, Armonk, NY (US)

(72) Inventors: Michael Karl Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/133,792

(22) Filed: Sep. 18, 2018

(65) Prior Publication Data

US 2019/0034296 A1 Jan. 31, 2019

Related U.S. Application Data

(63) Continuation of application No. 15/070,012, filed on Mar. 15, 2016, now Pat. No. 10,310,952, which is a
(Continued)

(51) Int. Cl.
*G06F 11/00* (2006.01)
*G06F 11/14* (2006.01)
(Continued)

(52) U.S. Cl.
CPC ........ *G06F 11/1474* (2013.01); *G06F 3/0619* (2013.01); *G06F 3/0629* (2013.01);
(Continued)

(58) Field of Classification Search
CPC .. G06F 11/1474; G06F 3/0673; G06F 3/0629; G06F 3/0619; G06F 11/1451;
(Continued)

(56) References Cited

U.S. PATENT DOCUMENTS 5,335,343 A * 8/1994 Lampson ................ G06F 9/466
714/19
5,586,297 A 12/1996 Bryg et al.
(Continued)

OTHER PUBLICATIONS

IBM: List of IBM Patents or Patent Applications Treated as Related (Appendix P), Oct. 29, 2018, pp. 1-2.
(Continued)

*Primary Examiner* — Yair Leibovich
(74) *Attorney, Agent, or Firm* — Michael O'Keefe

(57) ABSTRACT

Autonomous recovery from a transient hardware failure by executing portions of a stream of program instructions as a transaction. A start of a transaction is created in a stream of program instructions executing on a first processor of a multi-processor computer. A snapshot of a system state information is saved when the transaction begins. When the transaction ends, store data of the transaction is committed. If a transient hardware failure occurs, the transaction is aborted without notifying the computer software application that initiated the stream of program instructions. The transaction is re-executed on a second processor of the multi-processors, based on the saved snapshot of the system state information.

12 Claims, 9 Drawing Sheets

Related U.S. Application Data continuation of application No. 14/163,384, filed on Jan. 24, 2014, now Pat. No. 9,317,379.

(51) Int. Cl.
    *G06F 13/24* (2006.01)
    *G06F 9/46* (2006.01)
    *G06F 3/06* (2006.01)

(52) U.S. Cl.
    CPC ............ *G06F 3/0673* (2013.01); *G06F 9/466* (2013.01); *G06F 11/1407* (2013.01); *G06F 11/1438* (2013.01); *G06F 11/1451* (2013.01); *G06F 13/24* (2013.01); *G06F 2201/805* (2013.01); *G06F 2201/825* (2013.01); *G06F 2201/84* (2013.01)

(58) Field of Classification Search
    CPC .. G06F 9/466; G06F 11/1438; G06F 11/1407; G06F 13/24; G06F 2201/84; G06F 2201/805; G06F 2201/825
    USPC .......................................................... 714/16
    See application file for complete search history.

(56) References Cited

U.S. PATENT DOCUMENTS

| | | | |
|---|---|---|---|
| 5,721,918 A | 2/1998 | Nilsson et al. | |
| 6,349,361 B1 | 2/2002 | Altman et al. | |
| 7,512,772 B2 | 3/2009 | Gschwind et al. | |
| 7,702,950 B2 | 4/2010 | Gatto et al. | |
| 7,752,505 B2 | 7/2010 | Gschwind et al. | |
| 7,977,965 B1 | 7/2011 | Fleischer et al. | |
| 8,010,550 B2 | 8/2011 | Duffy et al. | |
| 8,041,900 B2 | 10/2011 | Caprioli et al. | |
| 8,086,827 B2 | 12/2011 | Welc et al. | |
| 8,188,761 B2 | 5/2012 | Fleischer et al. | |
| 8,209,689 B2 | 6/2012 | Raikin et al. | |
| 8,239,633 B2 | 8/2012 | Wood et al. | |
| 8,281,185 B2* | 10/2012 | Nussbaum | G06F 9/3004 707/703 |
| 8,316,352 B2 | 11/2012 | Lev et al. | |
| 8,321,637 B2 | 11/2012 | Baum et al. | |
| 8,327,188 B2 | 12/2012 | Karlsson et al. | |
| 8,495,607 B2 | 7/2013 | Gschwind | |
| 8,521,961 B2 | 8/2013 | Eichenberger et al. | |
| 8,739,164 B2 | 5/2014 | Chung et al. | |
| 9,244,781 B2* | 1/2016 | Cain, III | G06F 11/1407 |
| 9,317,379 B2 | 4/2016 | Gschwind et al. | |
| 9,424,072 B2* | 8/2016 | Busaba | G06F 12/0875 |
| 9,639,415 B2* | 5/2017 | Busaba | G06F 11/1407 |
| 9,817,644 B2 | 11/2017 | Breternitz, Jr. et al. | |
| 2003/0070080 A1 | 4/2003 | Rosen | |
| 2004/0044850 A1 | 3/2004 | George et al. | |
| 2004/0068501 A1 | 4/2004 | McGoveran et al. | |
| 2008/0244354 A1 | 10/2008 | Wu et al. | |
| 2008/0244544 A1 | 10/2008 | Neelakantam et al. | |
| 2009/0198694 A1 | 8/2009 | Thomas | |
| 2009/0288075 A1 | 11/2009 | Song et al. | |
| 2010/0057740 A1 | 3/2010 | Ni et al. | |
| 2010/0174840 A1 | 7/2010 | Blainey et al. | |
| 2010/0191884 A1 | 7/2010 | Holenstein et al. | |
| 2010/0325630 A1 | 12/2010 | Flood et al. | |
| 2010/0333093 A1* | 12/2010 | Nussbaum | G06F 9/30087 718/101 |
| 2011/0209155 A1 | 8/2011 | Giampapa et al. | |
| 2011/0219208 A1 | 9/2011 | Asaad et al. | |
| 2011/0246993 A1 | 10/2011 | Moir et al. | |
| 2012/0005461 A1 | 1/2012 | Moir et al. | |
| 2012/0079245 A1 | 3/2012 | Wang et al. | |
| 2012/0210162 A1 | 8/2012 | Gara et al. | |
| 2012/0210164 A1 | 8/2012 | Gara et al. | |
| 2012/0210172 A1 | 8/2012 | Gara et al. | |
| 2012/0246658 A1 | 9/2012 | Arndt et al. | |
| 2012/0324472 A1 | 12/2012 | Rossbach et al. | |
| 2013/0007750 A1 | 1/2013 | Beckerle et al. | |
| 2013/0019083 A1 | 1/2013 | Cain, III et al. | |
| 2013/0198139 A1 | 8/2013 | Skidanov et al. | |
| 2013/0268489 A1 | 10/2013 | Surlaker et al. | |
| 2013/0339709 A1 | 12/2013 | Greiner et al. | |
| 2013/0339975 A1* | 12/2013 | Busaba | G06F 9/44 718/104 |
| 2014/0181821 A1 | 6/2014 | Shavit et al. | |
| 2015/0212818 A1 | 7/2015 | Gschwind et al. | |
| 2015/0212851 A1 | 7/2015 | Busaba et al. | |
| 2015/0212852 A1 | 7/2015 | Gschwind et al. | |
| 2015/0212905 A1 | 7/2015 | Gschwind et al. | |
| 2015/0212906 A1 | 7/2015 | Gschwind et al. | |
| 2015/0355907 A1 | 12/2015 | Gschwind et al. | |
| 2016/0179876 A1 | 6/2016 | Jimenez Pens et al. | |
| 2016/0196192 A1 | 7/2016 | Gschwind et al. | |
| 2016/0196193 A1 | 7/2016 | Gschwind et al. | |
| 2019/0012241 A1* | 1/2019 | Gschwind | G06F 11/1451 |
| 2019/0034296 A1 | 1/2019 | Gschwind | |

OTHER PUBLICATIONS

McDonald, "Architectures for Transactional Memory", A Dissertation Submitted to the Department of Computer Science and the Committee on Graduate Studies of Stanford University in Partial Fulfillment of the Requirements for the Degree of Doctor of Philosophy, Jun. 2009, pp. 1-145.

Buti et al., "Organization and implementation of the register-renaming mapper for out-0f-order IBM POWER4 processors", IBM J_ Res. & Dev., vol. 49, No. 1, Jan. 2005, pp. 167-188.

Disclosed Anonymously, "A novel squash and recovery mechanism in transactional memory system", IP.com Prior Art Database Technical Disclousre, IPCOM000196579D, Jun. 7, 2010, 3 pages.

Gottschlich et al., "Extending Contention Managers for User-Defined Priority-Based Transactions," Workshop on Exploiting Parallelism with Transactional Memory and other Hardware Assisted Methods {EPHAM), Boston, MA, 2008, 10 pages.

Gschwind et al., "SoftBeam: Precise Tracking of Transient Faults and Vulnerability Analysis at Processor Design Time", IBM Research Report, RC25220 {W905-046) May 18, 2009, IEEE 29th International Conference on Computer Design {ICCD), pp. 404-410, IEEE, 2011, http://domino.research.ibm.com/library/cyberdig.nsf/papers/DCE60F2D3E6188C38525792C00500CD2/$File/rc25220. pdf.

IBM, "Principles of Operation", Tenth Edition {Sep. 2012), SA22-7832-09.

Intel Corporation, "Intel® Architecture Instruction Set Extensions Programming Reference", 319433-012A, Feb. 2012.

Mak et al., "IBM System z10 Processor Cache Subsystem Microarchitecture", IBM J_ Res. & Dev. vol. 53, No. 1, Paper 2, 2009, pp. 2:1-2:12.

Peng et al., "Conflict Detection Via Adaptive Signature for Software Transactional Memory", 2010 2nd International Conference on Computer Engineering and Technology {ICCET), vol. 2, Apr. 2010, pp. V2-306-V2-310.

Porter et al., "Operating System Transactions", Proceedings of the ACM SIGOPS 22nd symposium on Operating systems principles, pp. 161-176, 2009, ACM.

Song et al., "Error Detection by Redundant Transaction in Transactional Memory System", 2011 Sixth IEEE International Conference on Networking, Architecture, and Storage, pp. 220-224.

Sanchez et al., "Implementing Signatures for Transactional Memory", 4oth IEEE/ACM International Symposium on Microarchitecture, 2007 IEEE, pp. 123-133.

Jacobi et al., "Transactional Memory Architecture and Implementation for IBM System z", Proceedings 2012 IEEE/ACM 45th International Symposium on Microarchitecture MICR0-45, presented Dec. 1-5, 2012, pp. 25-36.

IBM: List of IBM Patents or Patent Applications Treated as Related (Appendix P), Mar. 11, 2020, pp. 1-2.

* cited by examiner

USING TRANSACTIONAL EXECUTION FOR RELIABILITY AND RECOVERY OF TRANSIENT FAILURES

BACKGROUND

This disclosure relates generally to transactional memory systems and more specifically to a method, computer program and computer system for recovering from transient failures by using transactions.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (HTM, or in this discussion, simply TM) have been introduced, wherein a group of instructions—called a transaction—operate in an atomic manner on a data structure in memory, as viewed by other central processing units (CPUs) and the I/O subsystem (atomic operation is also known as "block concurrent" or "serialized" in other literature). The transaction executes optimistically without obtaining a lock, but may need to abort and retry the transaction execution if an operation, of the executing transaction, on a memory location conflicts with another operation on the same memory location. Previously, software transactional memory implementations have been proposed to support software Transactional Memory (TM). However, hardware TM can provide improved performance aspects and ease of use over software TM.

U.S. Patent Application Publication US20080244354 A1 titled "Apparatus and method for redundant multi-threading with recovery" filed 2007 Mar. 28 and incorporated by reference herein teaches a method and apparatus for reducing the effect of soft errors in a computer system is provided. Soft errors are detected by combining software redundant threading and instruction duplication. Upon detection of a soft error, errors are recovered through the use of software check pointing/rollback technology. Reliable regions are identified by vulnerability profiling and redundant multi-threading is applied to the identified reliable regions.

U.S. Patent Application Publication US20120210162 A1 titled "State recovery and lockstep execution restart in a system with multiprocessor pairing" filed 2011 Feb. 15 and incorporated by reference herein teaches a system, method and computer program product for a multiprocessing system to offer selective pairing of processor cores for increased processing reliability. A selective pairing facility is provided that selectively connects, i.e., pairs, multiple microprocessor or processor cores to provide one highly reliable thread (or thread group). Each paired microprocessor or processor cores that provide one highly reliable thread for high-reliability connect with a system components such as a memory "nest" (or memory hierarchy), an optional system controller, and optional interrupt controller, optional I/O or peripheral devices, etc. The memory nest is attached to a selective pairing facility via a switch or a bus. Each selectively paired processor core is includes a transactional execution facility, wherein the system is configured to enable processor rollback to a previous state and reinitialize lockstep execution in order to recover from an incorrect execution when an incorrect execution has been detected by the selective pairing facility.

SUMMARY

Embodiments of the present invention disclose a method, computer program product, and system for autonomous recovery from a transient hardware failure by executing each portion of a stream of program instructions as a transaction. A start of a transactional region portion of the stream of program instructions is created by an operating system on a multi-processor computer system configured to support transactional execution mode processing, where the portion of the stream of program instructions in the transactional region is to be executed as a transaction in transactional execution mode. The transactional region is started in transactional execution mode on a first processor of the multi-processors. A snapshot of the system state information is saved. The portion of the stream of program instructions is executed as a transaction. An end of the transactional region portion is created. In response to ending execution of the transactional region in transactional execution mode, store data of the transaction is committed to memory. In response to a transient hardware failure affecting a program resource required by one or more instructions in the a transactional region portion stream of program instructions executing as a transaction in transactional execution mode, aborting the transaction without notifying a computer software application that initiated the stream of program instructions, and re-executing, by the operating system on a second processor of the multi-processors, the transactional region portion stream of program instructions as a transaction in transactional execution mode, based on the saved snapshot of the system state information.

BRIEF DESCRIPTION OF THE SEVERAL VIEWS OF THE DRAWINGS

One or more aspects of the present disclosed embodiments are particularly pointed out and distinctly claimed as examples in the claims at the conclusion of the specification. The foregoing and other objects, features, and advantages of the disclosed embodiment are apparent from the following detailed description taken in conjunction with the accompanying drawings in which:

DETAILED DESCRIPTION

Figures 1, 2:
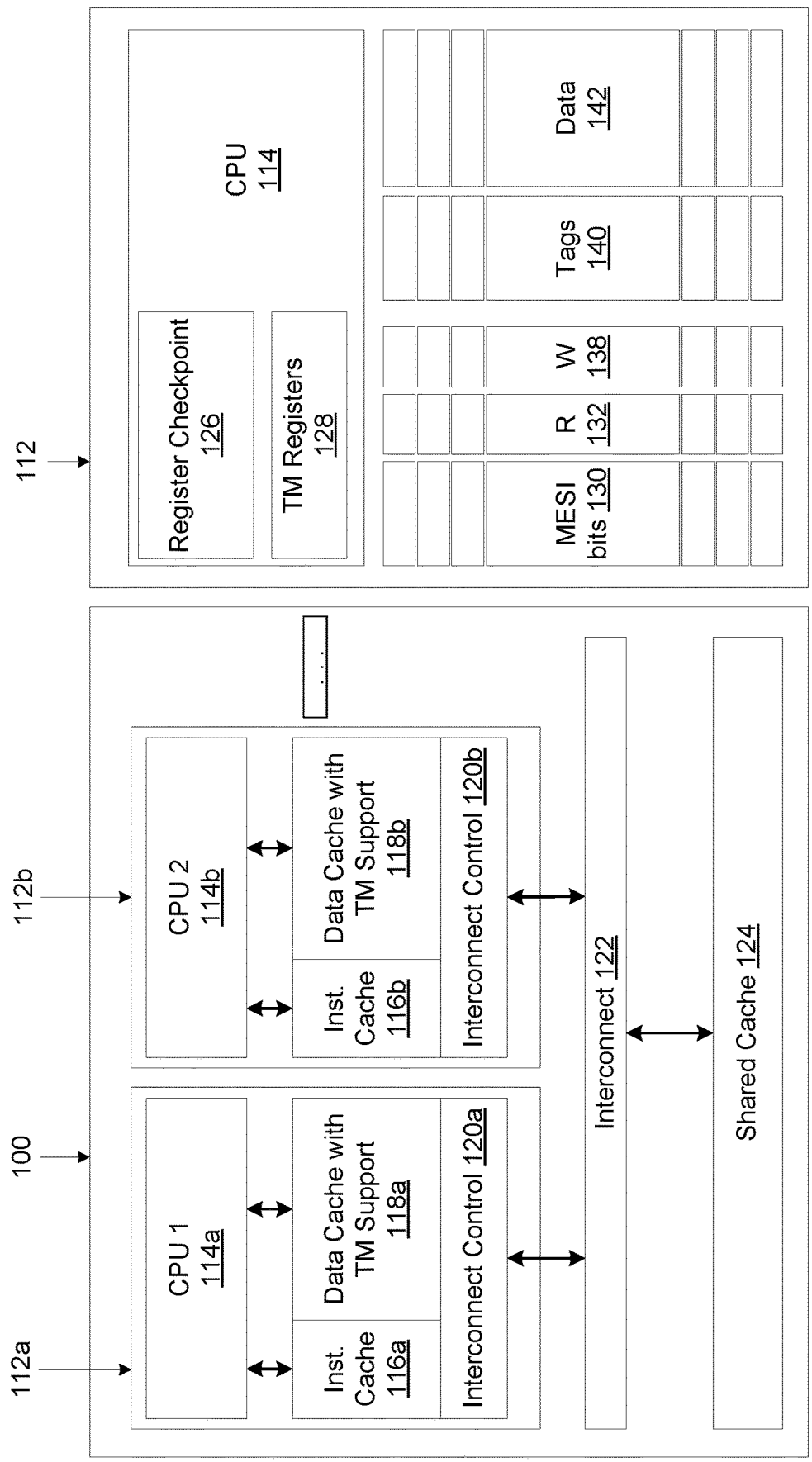
FIG. 1 depicts an example multicore transactional memory environment, in accordance with an illustrative embodiment.
FIG. 2 depicts en example multicore transactional memory environment, in accordance with an illustrative embodiment.

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor could be packaged on a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel® Based Embodiments

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress.

This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a # UD exception when used on a processor that does not support RTM.

Detection of XTEST Instruction

A processor supports the XTEST instruction if it supports either HLE or RTM. An application must check either of these feature flags before using the XTEST instruction. This instruction will generate a # UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a # UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's writeset). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
|---|---|
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (# DB) or breakpoint exception (# BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:

XABORT
CPUID
PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

10: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.

UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (# DE, # OF, # NP, # SS, # GP, # BR, #UD, # AC, # XF, # PF, # NM, # TS, # MF, # DB, # BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P10 reads line A in a transactional region and another logical processor P1 writes line A (either inside or outside a transactional region) then logical processor P10 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution Embodiments

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure that transactions appear to be performed atomically, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

FIGS. 1 and 2 depict an example of a multicore TM environment. FIG. 1 shows many TM-enabled CPUs (CPU1 114a, CPU2 114b, etc.) on one die 100, connected with an interconnect 122, under management of an interconnect control 120a, 120b. Each CPU 114a, 114b (also known as a Processor) may have a split cache consisting of an Instruction Cache 116a, 166b for caching instructions from memory to be executed and a Data Cache 118a, 118b with TM support for caching data (operands) of memory locations to be operated on by CPU 114a, 114b (in FIG. 1, each CPU 114a, 114b and its associated caches are referenced as 112a, 112b). In an implementation, caches of multiple dies 100 are interconnected to support cache coherency between the caches of the multiple dies 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die may have access to a shared cache 124, shared amongst all the processors of all the dies 100.

FIG. 2 shows the details of an example transactional CPU environment 112, having a CPU 114, including additions to support TM. The transactional CPU (processor) 114 may include hardware for supporting Register Checkpoints 126 and special TM Registers 128. The transactional CPU cache may have the MESI bits 130, Tags 140 and Data 142 of a conventional cache but also, for example, R bits 132 showing a line has been read by the CPU 114 while executing a transaction and W bits 138 showing a line has been written-to by the CPU 114 while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

| | | VERSIONING | |
|---|---|---|---|
| | | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a write-buffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are LogTM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 130 state transitions (cache line indicators corresponding to Modified, Exclusive, Shared, and Invalid code states) are left mostly unchanged. Outside of a transaction, the MESI 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E→I, I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI's 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

| | | Example Transaction Code | |
|---|---|---|---|
| | LHI | R0,0 | *initialize retry count=0 |
| loop | TBEGIN | | *begin transaction |
| | JNZ | abort | *go to abort code if CC1=0 |
| | LT | R1, lock | *load and test the fallback lock |
| | JNZ | lckbzy | *branch if lock busy |
| | ... perform operation ... | | |
| | TEND | | *end transaction |
| | ... ... ... ... | | |
| lckbzy | TABORT | | *abort if lock busy; this |
| | | | *resumes after TBEGIN |
| abort | JO | fallback | *no retry if CC=3 |
| | AHI | R0, 1 | *increment retry count |
| | CIJNL | R0,6, fallback | *give up after 6 attempts |
| | PPA | R0, TX | *random delay based on retry count |
| | ... potentially wait for lock to become free ... | | |
| | J | loop | *jump back to retry fallback |
| | OBTAIN | lock | *using Compare&Swap |
| | ... perform operation ... | | |
| | RELEASE | lock | |
| | ... ... ... ... | | |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 114 (FIG. 2) assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octo-words (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| | |
|---|---|
| TBEGINC | *begin constrained transaction |
| ... perform operation ... | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

Figure 3:
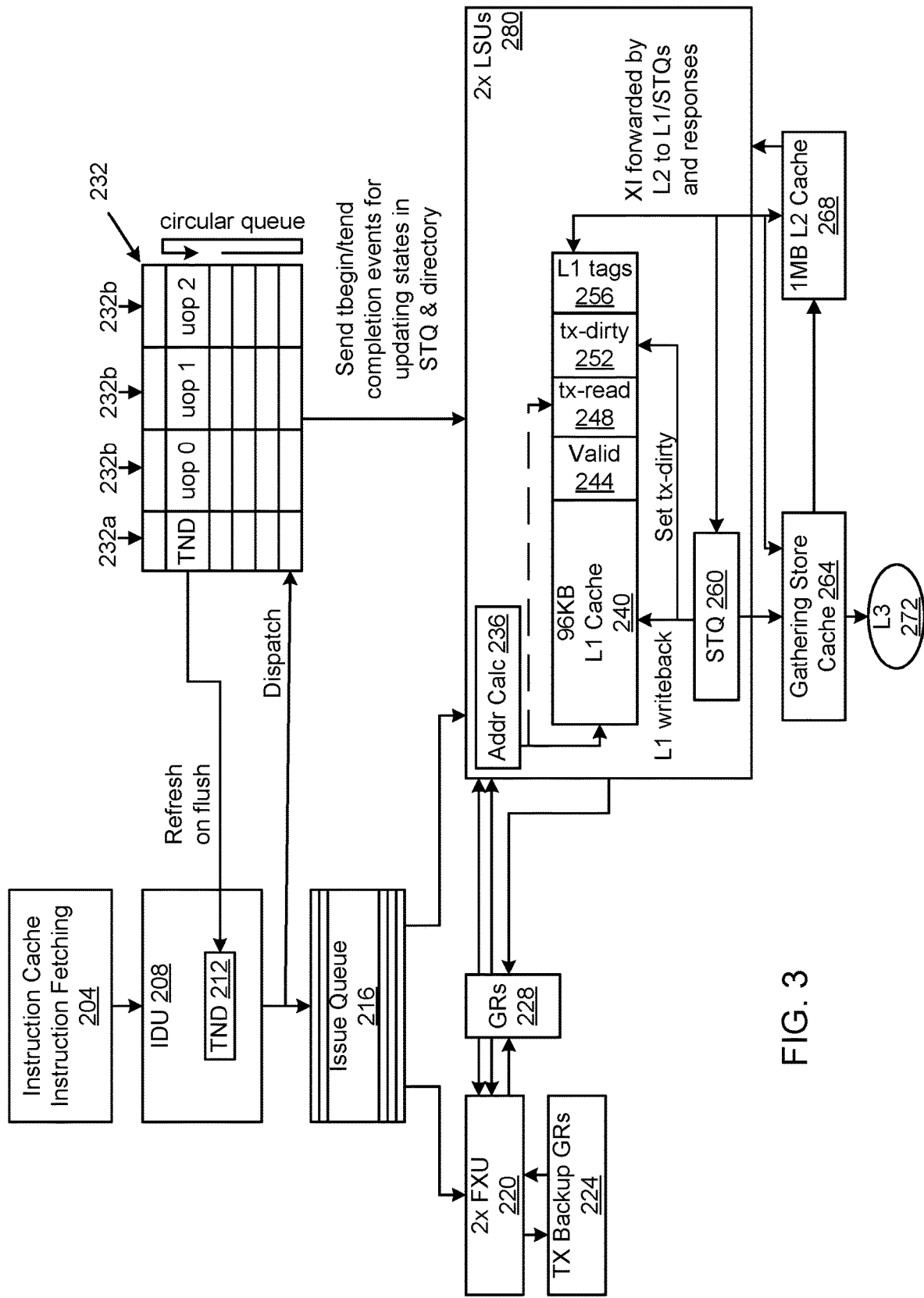
FIG. 3 depicts example components of an example CPU, in accordance with an illustrative embodiment.

With reference to FIG. 3, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 232b) are written into a unified issue queue 216, from where they can be issued out-of-order. Up to two fixed-point, one floating-point, two load/store, and two branch instructions can execute every cycle. A Global Completion Table (GCT) 232 holds every micro-op 232b and a transaction nesting depth (TND) 232a. The GCT 232 is written in-order at decode time, tracks the execution status of each micro-op 232b, and completes instructions when all micro-ops 232b of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. The L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 3 depicts example components of an example transactional execution environment, including a CPU and caches/components with which it interacts (such as those depicted in FIGS. 1 and 2). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction. When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236 is included in the LSU 280. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232b (including, for example uop 0, uop 1, and uop2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-ops 232b to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232b instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1-directory 256 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114 (FIG. 2) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1 240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114 (FIGS. 1 and 2) against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

Store Cache

In prior systems, since the L1 240 and L2 268 are store-through caches, every store instruction causes an L3 272 store access; with now 6 cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The cache 264 is a circular queue of 64 entries, each entry holding 128 bytes of data with byte-precise valid bits. In non-transactional operation, when a store is received from the LSU 280, the store cache 264 checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache 264 is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache 264 overflows. The LSU 280 detects this condition when it tries to send a new store that cannot merge into an existing entry, and the entire store cache 264 is filled with stores from the current transaction. The store cache 264 is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache 264 is notified and all entries holding transactional data are invalidated. The store cache 264 also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 238 to restore.

The CPU 114 (FIG. 2) supports a special millicode-only instruction to read out the backup-GRs 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 (FIG. 2) to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

Computer software applications may be processed on CPUs as a stream of program instructions. Correct execution of that stream of program instructions in an application program may be crucial, especially for critical applications.

Transient erroneous execution failures may, for example, change logic values in a circuit due to the presence of charged particles in the environment. As more and more functionality is stored on a hardware chip, the likelihood of a radiation induced transient failure increases. Transient failures may cause data manipulated within the computer software application to be corrupted. Recognizing and handling transient failures allows computer software applications to be more resilient and may allow the computer software application to reliably utilize any calculations or other tasks accomplished in the application.

A machine check raised for a transient failure may prevent data corruption in the computer software application, but it does not allow the application to move forward. Critical applications may recover from such transient failures by repeating the execution of a part of the program instructions when a transient failure is detected. Typically, the program instructions may be repeated from a last computer software application checkpoint. Check-pointing by a computer software application may cause the computer software application to be written such that its state may be rolled back to a previous value, known to be correct, and then re-executed from that roll back point. Computer software application check-pointing may be done at large time intervals, causing a large number of performed calculations to be repeated upon error detection. Thus, in one or more embodiments of the disclosure, it may be desirable for computer software applications, especially critical applications, to divide the computer software application stream of program instructions into sets of transactions to advantageously use the design and recovery capabilities of transactional execution to create finer granularity check-pointing and to allow for recovery from transient failures.

Typically, detection of transient erroneous execution failures requires multiple executions of the same program to run in parallel and in lockstep or requires multiple executions to compare program results. Detection of transient erroneous execution failures may also require dedicated hardware to perform cycle-by-cycle comparison of parallel execution results. Soft errors, like transient erroneous execution failures, may also be transient and cause wrong results. A soft error may corrupt a register value, causing a wrong computational result. Parity bits (a bit added to the end of a string of binary code that indicates whether the number of bits in the string with the value one is even or odd) may be one way to detect soft errors. Self auditing latches and transactional digests may also recognize transient errors that corrupt data. The above errors may be referred to collectively as "hardware faults."

Figure 4:
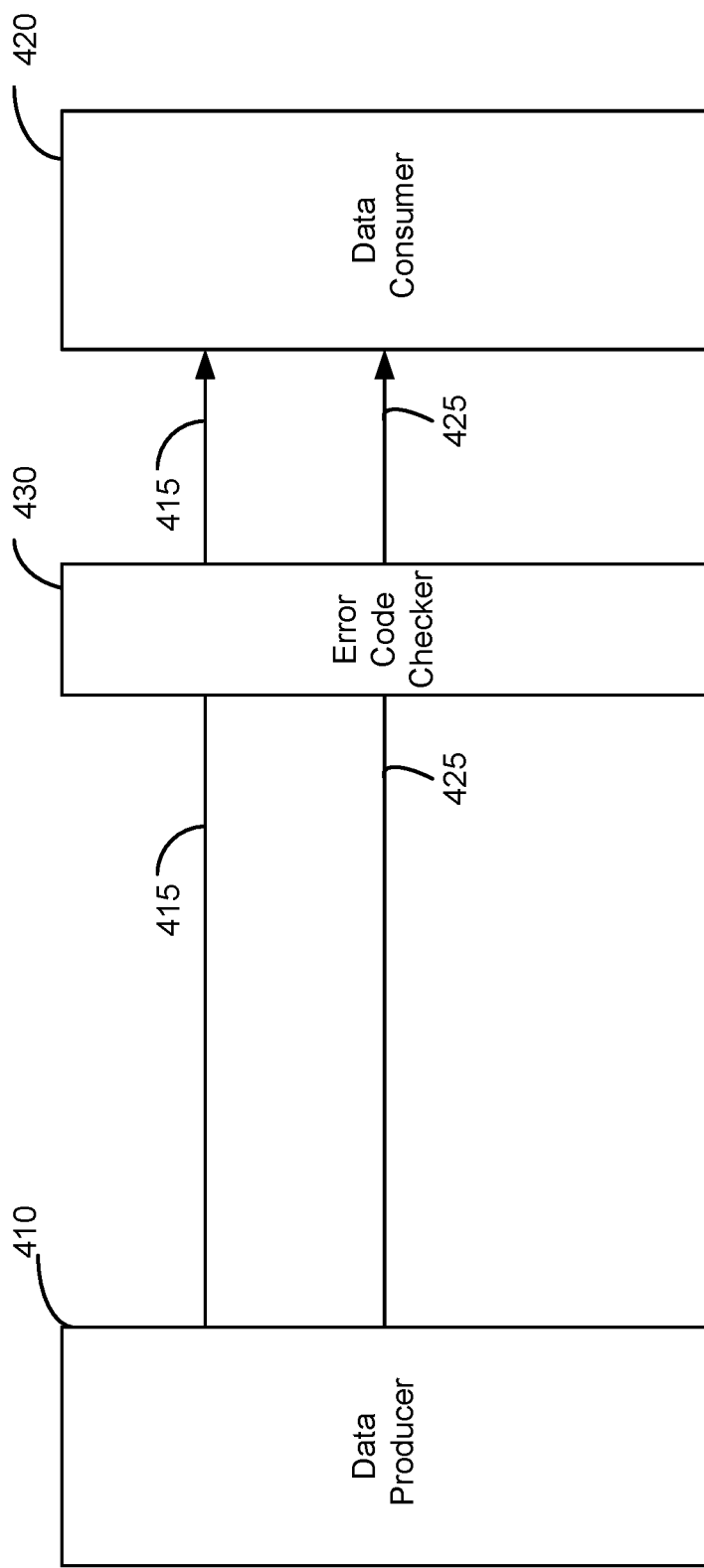
FIG. 4 depicts an exemplary schematic block diagram illustrating an error checking mechanism within the data processing environment of FIG. 9, in accordance with an embodiment of the disclosure.

Referring now to FIG. 4, an exemplary schematic block diagram illustrating an error checking mechanism in accordance with an embodiment of the disclosure is depicted. In one embodiment, a data producer 410 and a data consumer 420 may be hardware components of a microprocessor including, but not limited to, a register file, a cache and a compute unit. In one embodiment, the data producer 410 may transmit data 415 on a hardware mechanism, such as a chip, along with error detection information 425. A parity bit may be an example of error detection information. An error code checker 430 may verify, using the error detection information 425, that the data 415 coming out the other end of the chip has not been corrupted before sending the data 415 on to the data consumer 420. In another embodiment, the data producer 410 may transmit the data 415 and the error detection information 425 on a temporal mechanism such as processor memory. In an exemplary embodiment a register file may be stored in memory as the data 415, along with a parity bit as the error detection information 425. When retrieving the register file from memory, the error code checker 430 may verify the parity to ensure the data 415 was not corrupted either during the storage into memory, during the retrieval from memory or while stored in memory. Errors detected by the error code checker 430 may raise a machine check for the detected error, preventing data corruption of a computer software application and ending the execution of the computer software application.

In one or more embodiments of the disclosure, transactions encountering hardware faults including those detected by parity bit errors, self-auditing latch errors (i.e., when a latch indicates that it has suffered a transient fault in accordance with latch designs described in prior art), hardware pairing errors, transactional digest mismatches and any other failure mechanisms existing now or in the future, may be automatically recovered. Typically, hardware faults may only be recovered when backup copies of data are maintained, but in embodiments of the disclosure, transactional execution retry may provide a mechanism to recover from hardware faults without maintaining data backup copies, without lockstep execution and with only a single thread.

In embodiments of the disclosure, computer software applications may be executed as a series of transactions without requiring computer software application modification. The computer software application's stream of program instructions may be divided into sets of transactions. The start and stop of each transaction may be determined either by a hardware mechanism, or by an instruction. In at least one embodiment, the transaction start and end-mode test point instructions may be inserted during the computer software application compilation. In at least one other embodiment, the transaction start and end-mode test point instructions may be inserted during instruction fetch.

Figure 5:
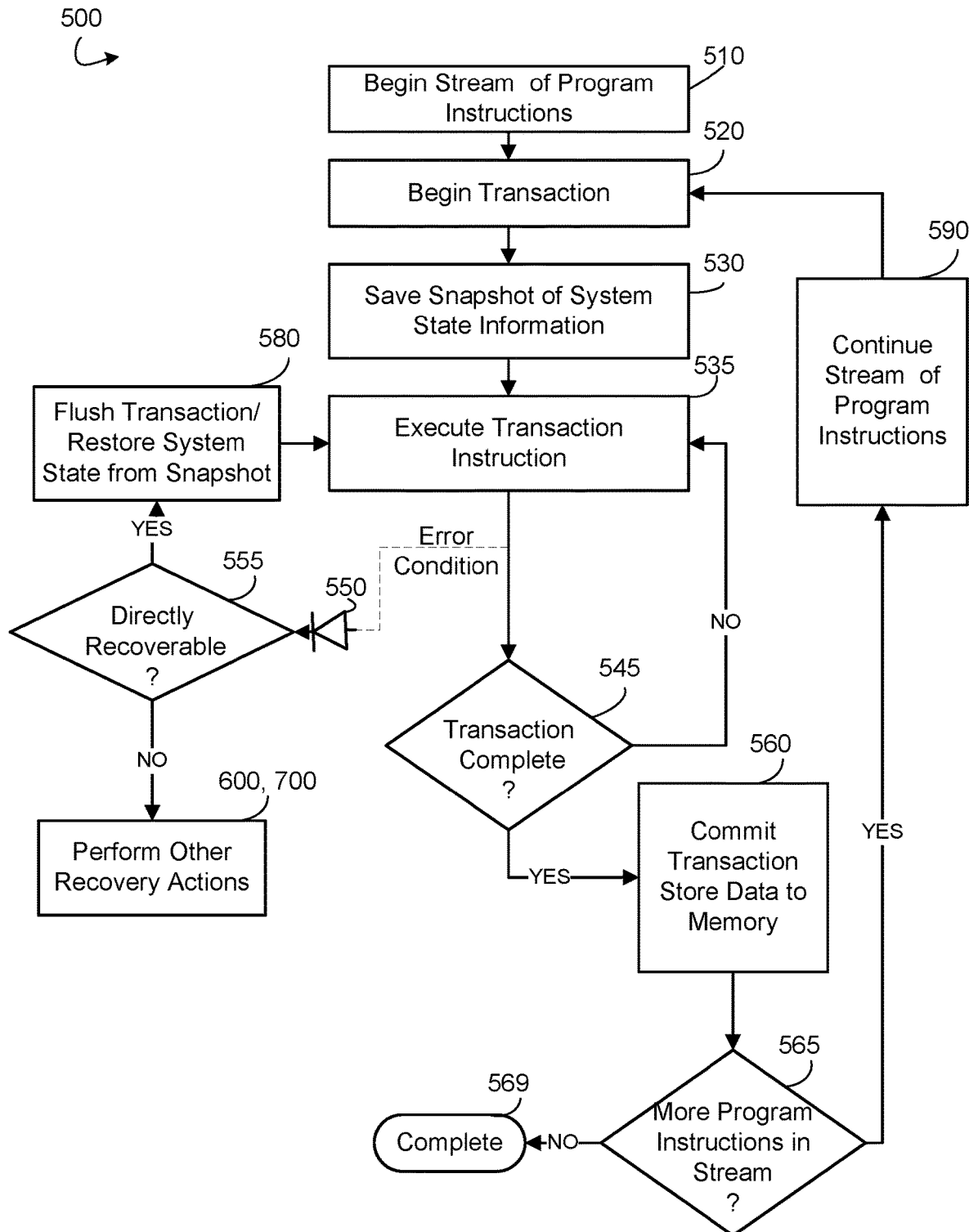
FIG. 5 is a flowchart illustrating operations performed by a processor for executing a transaction within a stream of program instructions and recovering from a hardware fault using transactional execution capabilities, illustrated within the data processing environment of FIG. 9, in accordance with an embodiment of the disclosure.
Figure 9:
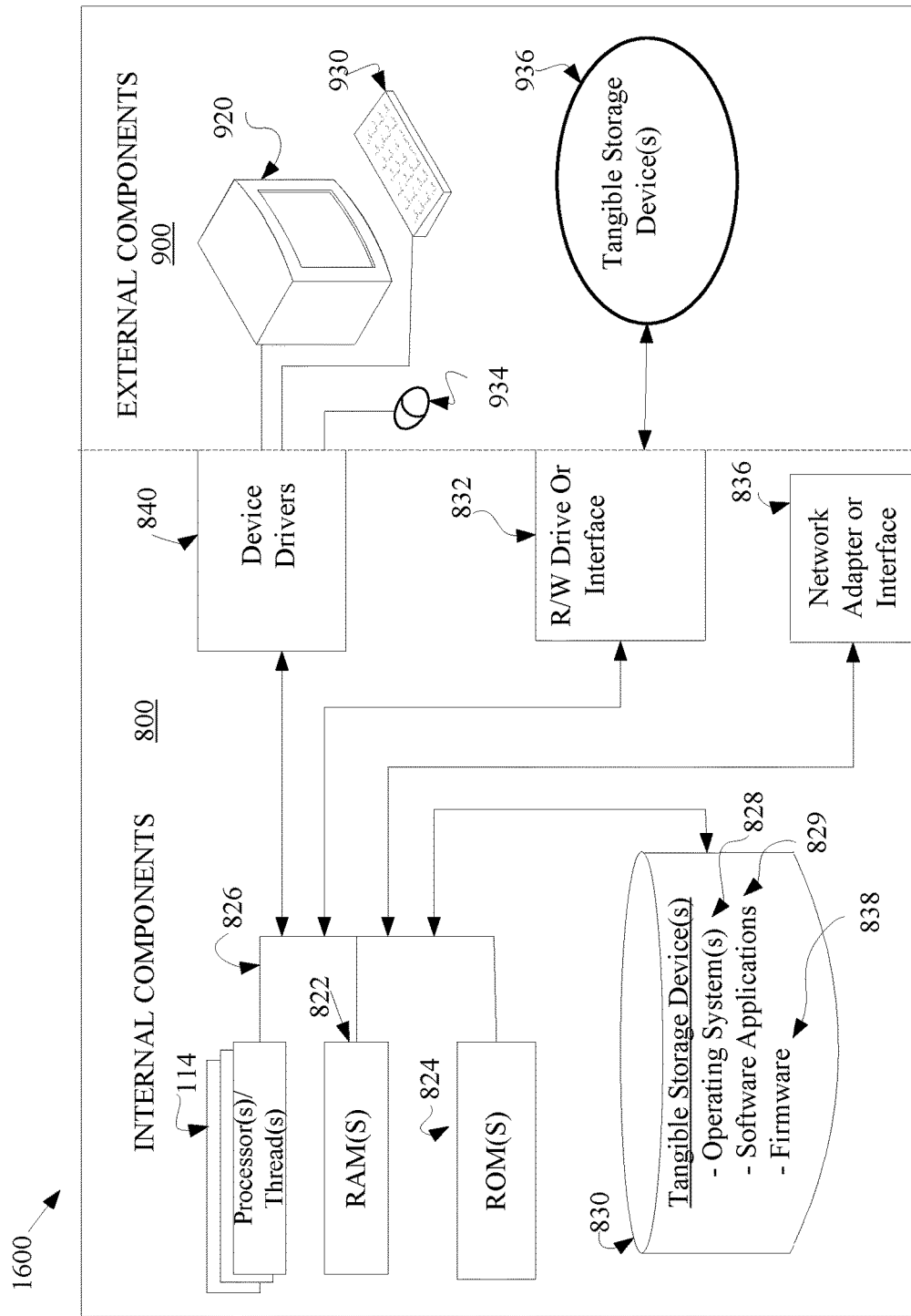
FIG. 9 is a schematic block diagram which illustrates internal and external components of a server computer in accordance with an illustrative embodiment.

Now referring to FIG. 5, a flowchart 500 illustrates operations performed by a processor 114 (FIG. 9) for executing a transaction within a stream of program instructions and recovering from a hardware fault using transactional execution capabilities, within the data processing environment of FIG. 9. The flowchart 500 illustrates an embodiment of the disclosure in which the computer software application's stream of program instructions may be divided into sets of transactions, each of which may quickly recover from a hardware fault autonomously, without notifying the computer software application. A mechanism may be provided for privileged software, including but not limited to, an operating system, a hypervisor and firmware (hereinafter "operating system") to recover or abort the computer software application for a hardware fault.

In an embodiment, the processor 114 (FIG. 9) may begin processing a stream of program instructions for a computer software application, at 510. At 520, the processor 114 (FIG. 9), on behalf of the operating system or due to a start transaction instruction, may initiate a transaction for a subset of the computer software application's instructions. Embodiments to dynamically initiate a transaction by the operating system will be described in more detail below, with reference to FIG. 8. Upon initiating the transaction for the subset of program instructions, the processor 114 (FIG. 9) may, at 530, save a snapshot of the system state information. The system state information may include, but is not limited to, processor control values, register values, and check-pointed memory. The processor 114 (FIG. 9) may, at 535, execute the subset of program instruction in the transaction and may iterate, at 545, until the transaction completes. Upon completion of the transaction, determined at 545, the processor 114 (FIG. 9) may commit the transaction store data to memory, at 560. If the computer software application's stream of program instructions have not all been executed, as determined at 565, the processor 114 (FIG. 9) may continue execution, at 590, with the program instruction following the end-mode test point. The processor 114 (FIG. 9) may then initiate a new transaction, at 520, for another subset of the program instructions, starting with the program instruction following the end-mode test point. If no additional program instructions remain in the computer software application's stream of program instructions, as determined at 565, the computer software application may complete, at 569.

An error condition may occur during execution of a transaction instruction and interrupt the transactional execution. The error condition including, but not limited to, a hardware fault, a transactional digest mismatch, and transactional data interference may be sent to the processor 114 (FIG. 9), at 550. The processor 114 (FIG. 9) may determine, at 555, whether the transaction may be directly recovered. The determination that a transaction is directly recoverable may include, but is not limited to, the processor 114 (FIG. 9) obtaining notification that a resource encountered an error condition and obtaining the saved snapshot of the system state. For a resource saved in the snapshot of the system state at the beginning of the transaction or for a resource not required as input to the transaction, the processor 114 (FIG. 9) may determine, at 555, that the transaction is directly recoverable and may utilize the transactional execution properties of the system to recover from the hardware fault. The processor 114 (FIG. 9) may, for the directly recoverable transaction, internally abort the transaction, without notifying the computer software application, and restart the transaction. The processor may, at 580, flush the system state, discard the transactional store data, restore the system state from the saved snapshot of the system state, reset any failed resources from the saved snapshot of the system state and restart the transaction, at 535, automatically, without notifying the computer software application. A retry of the transaction may be successful for a transient erroneous execution error or soft error. In an embodiment, the processor 114 (FIG. 9) may generate a log entry to record the occurrence of and information related to the hardware fault. In an embodiment the processor 114 (FIG. 9) may repetitively restart the transaction until a threshold number of unsuccessful attempts have been made. Repeated hardware faults on a resource may be an indicator of impending hardware failure. Upon reaching the threshold number of retry attempts, the processor 114 (FIG. 9) may determine the transaction may not be directly recoverable. In one or more embodiments, for a hardware fault that has been determined, at 555, to not be directly recoverable, the processor 114 (FIG. 9) may perform other recovery actions, at 600, 700. In one embodiment in which the transaction has been determined, at 555, to not be directly recoverable, the processor 114 (FIG. 9) may utilize software to perform other recovery actions. This embodiment will be described in detail below, with reference to FIG. 6. In another embodiment in which the transaction has been determined, at 555, to not be directly recoverable, the processor 114 (FIG. 9) may utilize a hardware exception to asynchronously perform other recovery actions. This embodiment will be described in detail below, with reference to FIG. 7. In yet another embodiment in which the transaction has been determined, at 555, to not be directly recoverable, the processor 114 (FIG. 9) may perform no other recovery actions but may, instead, generate a hardware exception and fail the computer software application.

Figure 6:
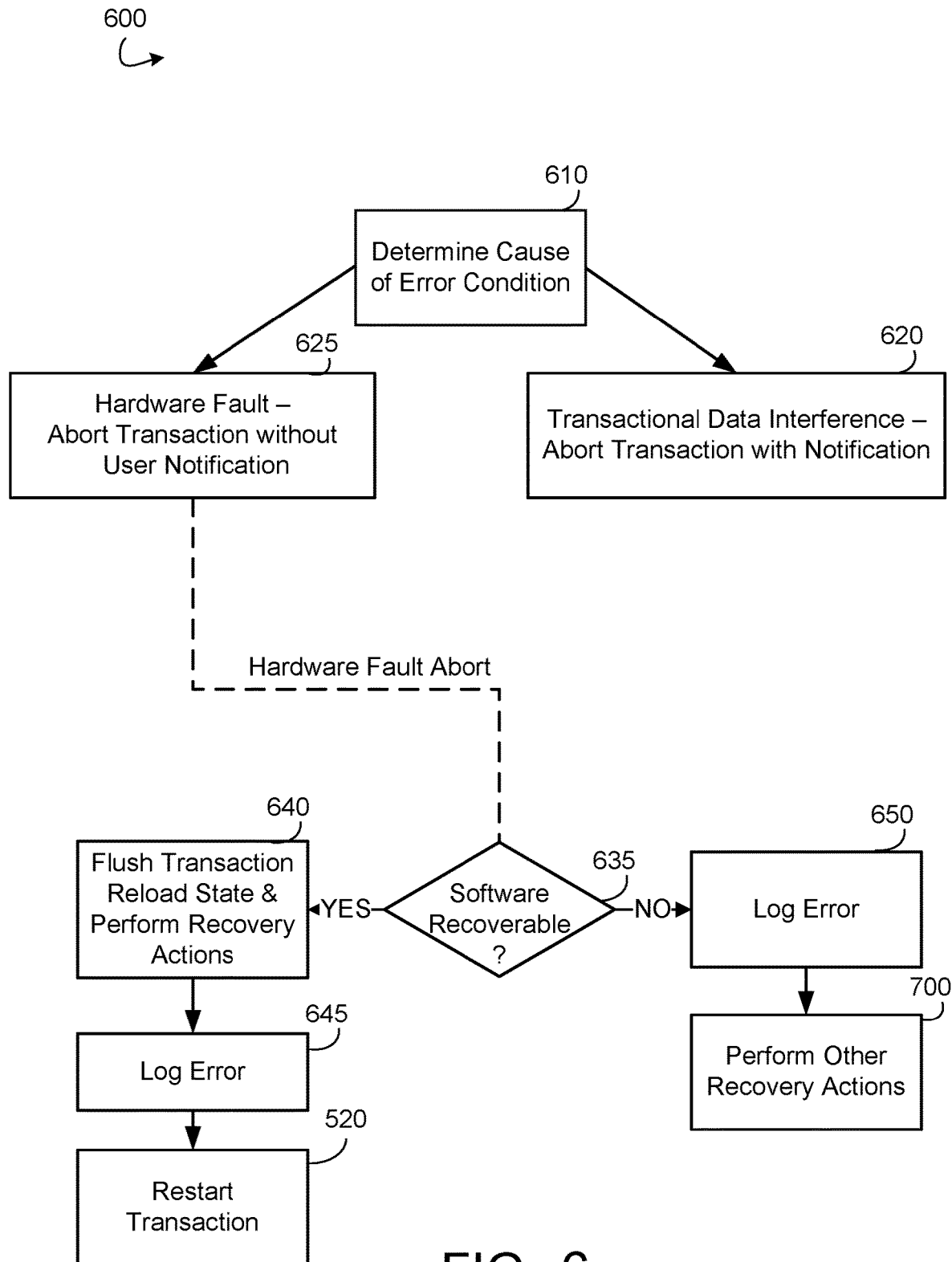
FIG. 6 is a flowchart illustrating operations performed by a processor for performing recovery actions for an error condition determined not to be directly recoverable, illustrated within the data processing environment of FIG. 9, in accordance with an embodiment of the disclosure.

Now referring to FIG. 6, a flowchart 600 illustrates operations performed by the processor 114 (FIG. 9) for performing recovery actions for an error condition determined not to be directly recoverable, within the data processing environment of FIG. 9. The flowchart 600 illustrates an embodiment of the disclosure in which the processor 114 (FIG. 9) may utilize software to recover from a hardware fault. In one embodiment, after determining, by the processor 114 (FIG. 9), that a transaction may not be directly recoverable from an error condition (see 555, FIG. 5), the processor 114 (FIG. 9) may, at 610 determine the cause of the error condition. Error conditions that may not be directly recoverable may include, but are not limited to, soft errors and transient erroneous execution errors on resources that may not have been saved in the snapshot of the system state, repetitive hardware faults and transactional data interference. In one or more embodiments, the cause of the error condition may be determined from information stored in any one of a control register, a transaction data block or a status register. The stored information may identify the type of error condition encountered, such as a transient hardware fault, and may also indicate whether the failing resource may be recovered from data check-pointed by the transaction.

For an error condition determined to be transactional data interference, the processor 114 (FIG. 9) may, at 620, abort the transaction and notify the initiator of the transaction of the abort condition. The initiator of the transaction may handle the transactional data interference abort utilizing known techniques. The transaction initiator may be the computer software application or the operating system. For an error condition determined to be a non-directly recoverable hardware fault, the processor 114 (FIG. 9) may, at 625, abort the transaction with an abort reason code that signals a hardware fault caused the abort. The processor 114 (FIG. 9) may also provide failure information with the hardware fault abort including, but not limited to, an abort reason indicating the reason for the hardware fault and the one or more resources encountering the hardware fault. Exemplary reasons for the hardware fault include parity errors and execution unit malfunction. The processor 114 (FIG. 9) may notify the operating system of the transaction abort condition without notifying the computer software application.

After the transaction has been aborted for a hardware fault, at 625, the processor 114 (FIG. 9) may receive control asynchronously, at 635, for the aborted transaction. The processor 114 (FIG. 9) may determine, at 635, if the failing resource that caused the transactional abort, may be software recovered. The failing resource may be software recovered by the processor 114 (FIG. 9) if the failing resource was check-pointed in the software prior to executing the transaction. In an exemplary embodiment, the computer software application may checkpoint registers in a known register area prior to transactional execution, but they may not be saved in the system snapshot. In this exemplary embodiment, a failed register may not be directly recovered from the saved snapshot of the system state, but may be restored from the known register area.

For a transaction whose failing resources may be software recovered, as determined at 635, the processor 114 (FIG. 9) may utilize the transactional execution properties of the system to recover from the hardware fault by combining software recovery of the software recoverable state and transaction-based recovery of other state information. The processor 114 (FIG. 9) may internally abort the transaction, without notifying the computer software application and restart the transaction. This embodiment may, at 640, flush the system state, discard the transactional store data, restore the system state from the saved snapshot of the system state and reset any failed resources from the check-pointed data. The processor 114 (FIG. 9) may, at 645, generate a log entry to record the occurrence of the hardware fault and restart the transaction at 520 (FIG. 5). In an embodiment the processor 114 (FIG. 9) may repetitively restart an aborted transaction, at 520 (FIG. 5), until a threshold number of unsuccessful attempts have been made. Retrying the transaction may be successful for a transient erroneous execution error or soft error. Repeated hardware faults on a resource may be an indicator of impending hardware failure. Upon reaching the threshold number of retry attempts, the processor 114 (FIG. 9) may determine the transaction may not be software recoverable. For a hardware fault that has been determined, at 635, to not be software recoverable, either for repeated failure or for a failed resource that had not been check-pointed prior to the transaction, the processor 114 (FIG. 9) may, at 650, generate a log entry to record the occurrence of the hardware fault and may perform other recovery actions, at 700. In one embodiment in which the transaction has been determined, at 635, to not be software recoverable, the processor 114 (FIG. 9) may utilize a hardware exception to asynchronously perform other recovery actions. This embodiment will be described in detail below, with reference to FIG. 7. In another embodiment in which the transaction has been determined, at 635, to not be software recoverable, the processor 114 (FIG. 9) may perform no other recovery actions but may, instead, generate a hardware exception and fail the computer software application.

Utilizing software to recover from hardware faults may be a less efficient mechanism than hardware alone. Software recovery options may expend additional execution cycles and may require modifications to existing transactional recovery to recognize hardware fault abort reasons and to handle single event upset transient failure aborts, but software recovery may expand recovery options and allow transactions to be more reliable.

Figure 7:
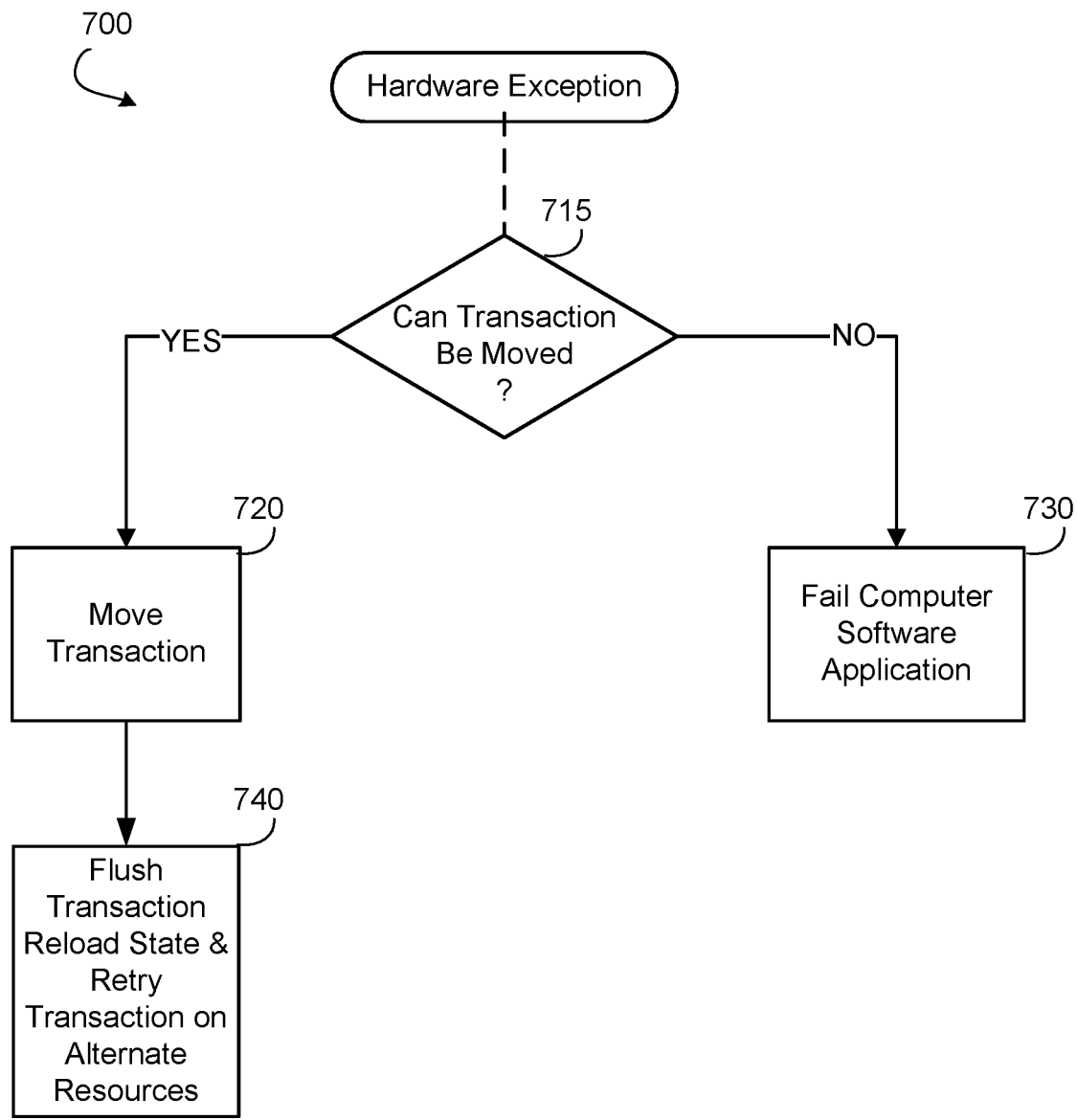
FIG. 7 is a flowchart illustrating operations performed by a processor for performing recovery actions for an error condition determined to not be software recoverable, illustrated within the data processing environment of FIG. 9, in accordance with an embodiment of the disclosure.

Now referring to FIG. 7, a flowchart 700 illustrates operations performed by the processor 114 (FIG. 9) for performing additional recovery actions for an error condition determined to not be software recoverable, within the data processing environment of FIG. 9. It should be noted that the embodiment described below may follow the determination, at 545 (FIG. 5) or 635 (FIG. 6) where the transaction was not directly recoverable or software recoverable. The flowchart 700 illustrates an embodiment of the disclosure in which the processor 114 (FIG. 9) may attempt to utilize transactional execution mechanisms to recover from a hardware exception caused by a hardware fault. In one embodiment, the operations of flowchart 700 are performed after the processor has unsuccessfully attempted to recover utilizing embodiments of flowchart 500 (FIG. 5) and flowchart 600 (FIG. 6).

In one or more embodiments, hardware may perform analysis of the hardware fault and provide diagnostic information including, but not limited to, lists of failing resources, and reasons for failures. The diagnostic information may be stored in system areas including, but not limited to memory and control registers. In an embodiment, the processor 114 (FIG. 9) may, after receiving a hardware exception, determine, at 715, if the transaction may be moved to other resources. The transaction may be moved when duplicate resources exist to replace the failing resources and transactional data for failed resources may be recovered from either hardware or software. If alternate resources exist, the processor 114 (FIG. 9) may, at 720, evacuate the work to another processor either by hardware or by initiating a service notification or by passing control to an operating system to address the hardware faults. Failing execution units may be disabled when alternate units exist and may be utilized in their place. The processor 114 (FIG. 9) may, at 740, advantageously utilize transactional execution capabilities to flush the system state, discard the transactional store data, restore the system state from the saved snapshot of the system state, reset any failed resource data and retry the transaction on the alternate resources. For a transaction that may not be moved, as determined at 715, the processor 114 (FIG. 9) may, at 730, fail the computer software application containing the transaction that could not be moved or restarted on alternate resources.

In one or more embodiments, a hardware exception may be the initial notification mechanism of a hardware fault and an operating system may receive control directly, thus avoiding a transactional abort for hardware faults. Avoiding transactional aborts for hardware faults may simplify computer software application abort handling by eliminating the need for computer software applications to be modified to recognize and handle hardware faults. The processor 114 (FIG. 9) executing operating system code, may utilize diagnostic data provided by the hardware exception to determine if the hardware fault is directly recoverable. If directly recoverable, the processor 114 (FIG. 9) may roll back the transaction and retry. For hardware faults that may not be directly recoverable, the processor 114 (FIG. 9) may abort the transaction with an abort code that may signal to the to a computer software application equipped to recognize a hardware fault abort code, that the transaction failed. Other embodiments may transfer control to an Event Based Branch routine or fail the computer software application.

In another embodiment, the hardware exception may flow to millicode, burned onto a chip, rather than an operating system. The millicode may perform analysis of the hardware fault to determine if the transaction may be restarted, may keep track of a retry threshold and may even initiate evacuation to an alternate processor or other alternate resources and restart. Providing support in millicode may improve recovery speed over providing support in software. In one or more embodiments, if the millicode encounters unrecoverable hardware faults, it may transfer control to an Event Based Branch routine or an operating system to continue the recovery actions.

In another embodiment, the processor 114 (FIG. 9) may transfer control directly to a computer software application's Event Based Branch routine for a hardware fault. An Event Based Branch routine may handle recovery from a hardware fault at the computer software application level rather than a system level. In this embodiment, the application may be required to build recovery for transactional execution failure due to hardware faults. Transferring control to an Event Based Branch routine may require less overhead to process than a hardware exception. Creating a common recovery routine may ease the burden of requiring all computer software applications to provide transactional execution recovery routines for hardware faults. In one or more embodiments, the hardware may perform analysis of the hardware fault and provide diagnostic information including, but not limited to, failing resources, and reasons for failure. The diagnostic information may be stored in system areas including, but not limited to memory and control registers. The processor 114 (FIG. 9) executing the Event Based Branch code may utilize the diagnostic data to determine if the hardware fault is directly recoverable. If directly recoverable, the processor 114 (FIG. 9) may roll back the transaction and retry. For hardware faults that are not directly recoverable, the processor 114 (FIG. 9) may abort the transaction with an abort code that may signal to the to a computer software application equipped to recognize a hardware fault abort code, that the transaction failed. Other embodiments may fail the computer software application. Utilizing an Event Based Branch may reduce overhead compared to using operating system level functions, and may also enable the programmer to integrate recovery more tightly with a specific application when compared to an exception handling routine performing recovery at an operating system level. On the other hand, using Event Based Branches in lieu of transaction abort may allow computer software applications to centralize recovery within the application rather than replicate recovery logic in conjunction with each transaction.

Figure 8:
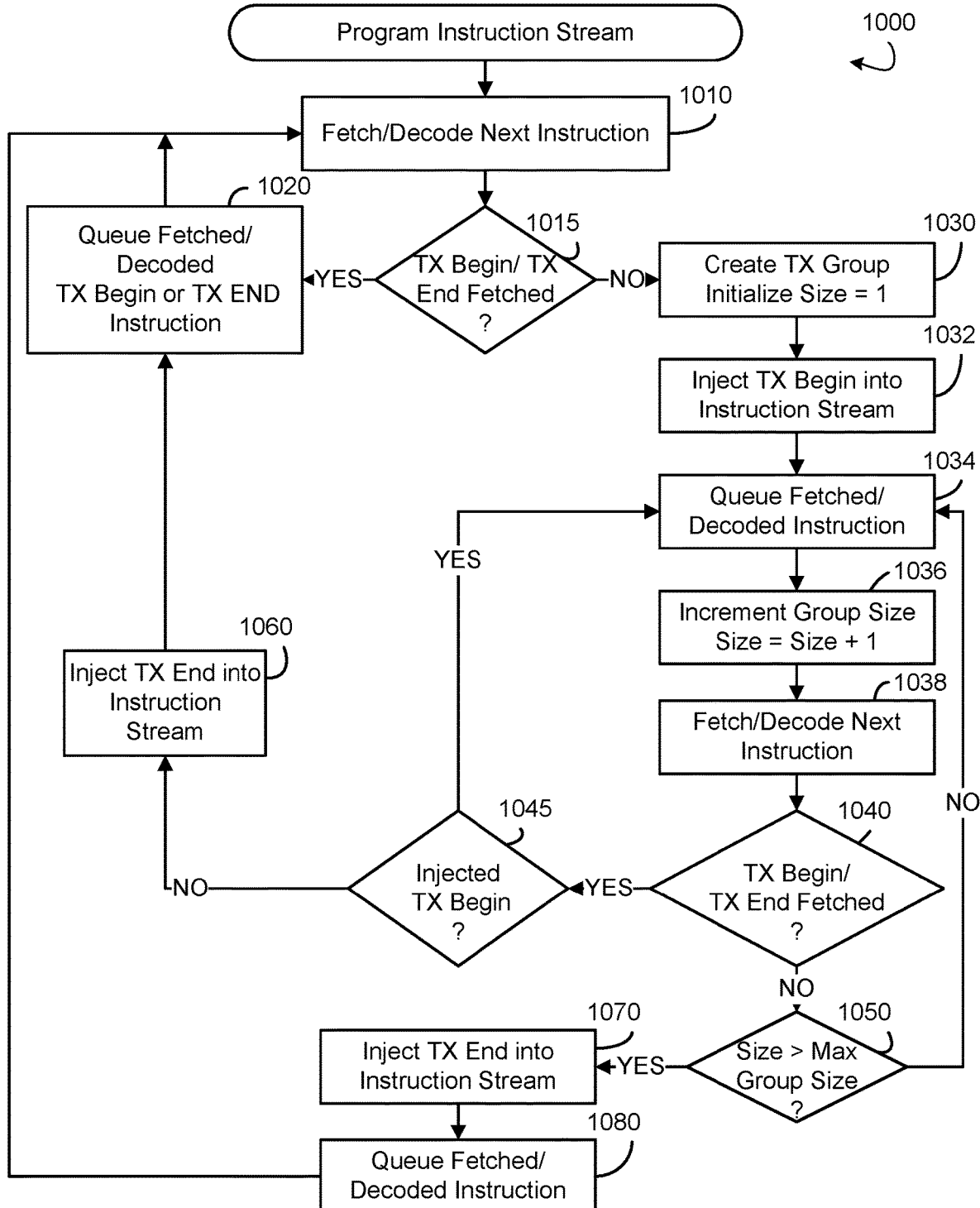
FIG. 8 is a flowchart illustrating operations performed by a processor for dynamically creating transactional regions in an input instruction stream during instruction fetch, illustrated within the data processing environment of FIG. 9, in accordance with an embodiment of the disclosure.

Now referring to FIG. 8, a flowchart 1000 illustrates operations performed by the processor 114 (FIG. 9) for dynamically creating transactional regions in an input stream of program instruction during instruction fetch, within the data processing environment of FIG. 9. The flowchart 1000 illustrates an embodiment of the disclosure in which the processor 114 (FIG. 9), may inject a transaction begin instruction and a transaction end instruction into the instruction stream of a computer software application in order to improve reliability and recoverability of the application without causing computer software application modification. In one embodiment, end-mode test points may be injected into the input stream of program instructions to determine the beginning and end of a dynamically created transactional region. In one or more embodiments, the end-mode test points may be a transaction begin and a transaction end instruction. Since the computer software application may be unmodified and unaware of the dynamically created transactional regions during fetch, only directly recoverable hardware faults described above, with reference to FIG. 5, may be handled for these dynamically created transactional regions. It should also be noted that some instructions may not be suitable to be executed within a transactional region and when encountered by fetch may cause an end-mode test point to be injected to end the dynamically created transactional region. The instruction may then be executed non-transactionally.

In an embodiment, the processor 114 (FIG. 9) may dynamically create the next transactional region immediately following the end-mode test point. In another embodiment, the processor 114 (FIG. 16) may execute a number of instructions non-transactionally prior to dynamically creating the next transactional region. The number of instructions may be as small as one instruction. In an embodiment, the number of instructions executed non-transactionally prior to dynamically creating the next transactional region may be a function of the maximum size of the dynamically created transactional region. The number "n" of instructions executed non-transactionally prior to the processor 114 (FIG. 9) dynamically creating the next transactional region may be a function of the size of the transactional region, where "k" may be a number, and where "size" may be the maximum size of the dynamically created transactional region. The function may include, but is not limited to, n=function(size) such as n=size, n=size/k, and n=size*k.

In an embodiment, the processor 114 (FIG. 9) may, at 1010, fetch and decode an instruction from the stream of program instructions. At this point, a dynamically created transactional region may not be executing. For a fetched and decoded transaction begin or transaction end instruction, as determined at 1015, the decoded transaction begin/transaction end instruction may be queued, at 1020, for processing and another instruction fetched and decoded at 1010. A transaction begin or transaction end instruction fetched outside of a dynamically created transactional region may be processed non-transactionally. For a fetched and decoded instruction that may not be a transaction begin or transaction end instruction, as determined at 1015, a dynamically created transactional region may be started. The processor may, at 1030, initialize the size of the dynamically created transactional region to one. A transaction begin instruction may then, at 1032, be injected by the processor 114 (FIG. 9) into the stream of program instructions. The processor 114 (FIG. 9) may then, at 1034, queue the fetched and decoded instruction for processing and increment the size of the dynamically created transactional region, at 1036. The processor 114 (FIG. 9) may then fetch and decode a next instruction from the stream of program instructions, at 1038. If the next instruction fetched and decoded is a transaction begin instruction or a transaction end instruction, determined at 1040, and is the transaction begin instruction injected at 1032, determined at 1045, the fetched and decoded injected transaction begin instruction may be queued for processing, at 1036.

For the next instruction, determined at 1040 to not be a transaction begin or transaction end instruction, and determined at 1050 to fit within the maximum dynamically created transactional region size (Size<=Max Group Size), the fetched and decoded instruction may be queued for processing at 1034. The processor 114 (FIG. 9) may continue to dynamically add instructions to the transactional region until either the maximum dynamically created transactional region size has been reached (Size>Max Group Size), at 1050, or the fetched and decoded instruction may be a transaction begin or transaction end, determined at 1040. A fetched and decoded transaction end instruction, as determined at 1040, or a fetched and decoded transaction begin instruction that is not an injected transaction begin instruction, as determined at 1045, may end the dynamically created transactional region. The processor 114 (FIG. 9) may end the dynamically created transactional region by injecting, at 1060, a transaction end instruction into the stream of program instructions and queuing the fetched and decoded transaction begin/transaction end instruction for processing at 1020. When the maximum size of a dynamically created transaction region has been reached, at 1050, the processor 114 (FIG. 9) may end the dynamically created transactional region by injecting a transaction end instruction into the stream of program instructions at 1070, and queuing the fetched and decoded instruction for processing, at 1080. The processor 114 (FIG. 9) may then fetch and decode a next instruction from the stream of program instructions, at 1010, outside of a dynamically created transactional region.

In an embodiment, the processor 114 (FIG. 9) may determine the maximum size of a dynamically created transaction region based on one or more of resource limits and code size characteristics. In another embodiment, the end-mode test point may be an instruction including a parameter used by the operating system to determine when to start and stop a dynamically created transactional region. The parameter may indicate one or more of a static maximum size of the dynamically created transactional region and a formula for determining the maximum size.

In another embodiment, the processor 114 (FIG. 9) may adapt the maximum size of the dynamically created transactional regions based on the success of prior transactions. Successive successful executions of dynamically created transactional regions may increase the maximum size and aborts of the transactional regions may decrease the maximum size.

Referring now to handling transactional aborts in dynamically created transaction regions due to exceeding buffer limits or data interference. In one embodiment, the processor 114 (FIG. 9) may commit the store data of the dynamically created transactional region. In this embodiment, the execution may appear as a non-transactional state in a multiprocessor environment.

In another embodiment, the processor 114 (FIG. 9) may roll back the transaction. In conjunction with the roll back, the processor 114 (FIG. 9) may delay the creation of the next dynamically created transactional region. In one embodiment, the processor 114 (FIG. 16) may execute a static number of instructions non-transactionally prior to dynamically creating the next transactional region. The number of static instructions may be as small as one instruction. In another embodiment, the number of instructions executed non-transactionally prior to dynamically creating the next transactional region may be a function of the maximum size of the dynamically created transactional region. The number "n" of instructions executed non-transactionally prior to the processor 114 (FIG. 9) dynamically creating the next transactional region may be a function of the size of the transactional region, where "k" may be a number, and where "size" may be the maximum size of a dynamically created transactional region. The function may include, but is not limited to, n=function(size) such as n=size, n=size/k, and n=size*k. In another embodiment, the processor 114 (FIG. 9) may immediately begin dynamically creating transactional regions after a first roll back, but may delay as described above for a subsequent abort.

Referring now to FIG. 9, computer system 1600 may include respective sets of internal components 800 and external components 900. Each of the sets of internal components 800 includes one or more processors 114; one or more computer-readable RAMs 822; one or more computer-readable ROMs 824 on one or more buses 826; one or more operating systems 828; one or more software applications 829; and one or more computer-readable tangible storage devices 830. The one or more operating systems 828 are stored on one or more of the respective computer-readable tangible storage devices 830 for execution by one or more of the respective processors 114 via one or more of the respective RAMs 822 (which typically include cache memory). The computer system 1600, in one embodiment of the disclosure, supports the multicore transactional memory environment and TM-enabled processors of FIG. 1. FIG. 9 illustrates the TM-enabled processors of FIG. 1, shown in the context of a computer system, as processors 114 of the computer system 1600. The processors 114, in this embodiment, are also configured to inject transaction begin and end-mode test points in a stream of program instruction during fetch. In the embodiment illustrated in FIG. 9, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The firmware 838 and operating system 828 that are associated with computer system 1600, can be downloaded to computer system 1600 from an external computer (e.g., server) via a network (for example, the Internet, a local area network or other, wide area network) and respective network adapters or interfaces 836. From the network adapters (or switch port adapters) or interfaces 836, the firmware 838 and operating system 828 associated with computer system 1600 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 10:
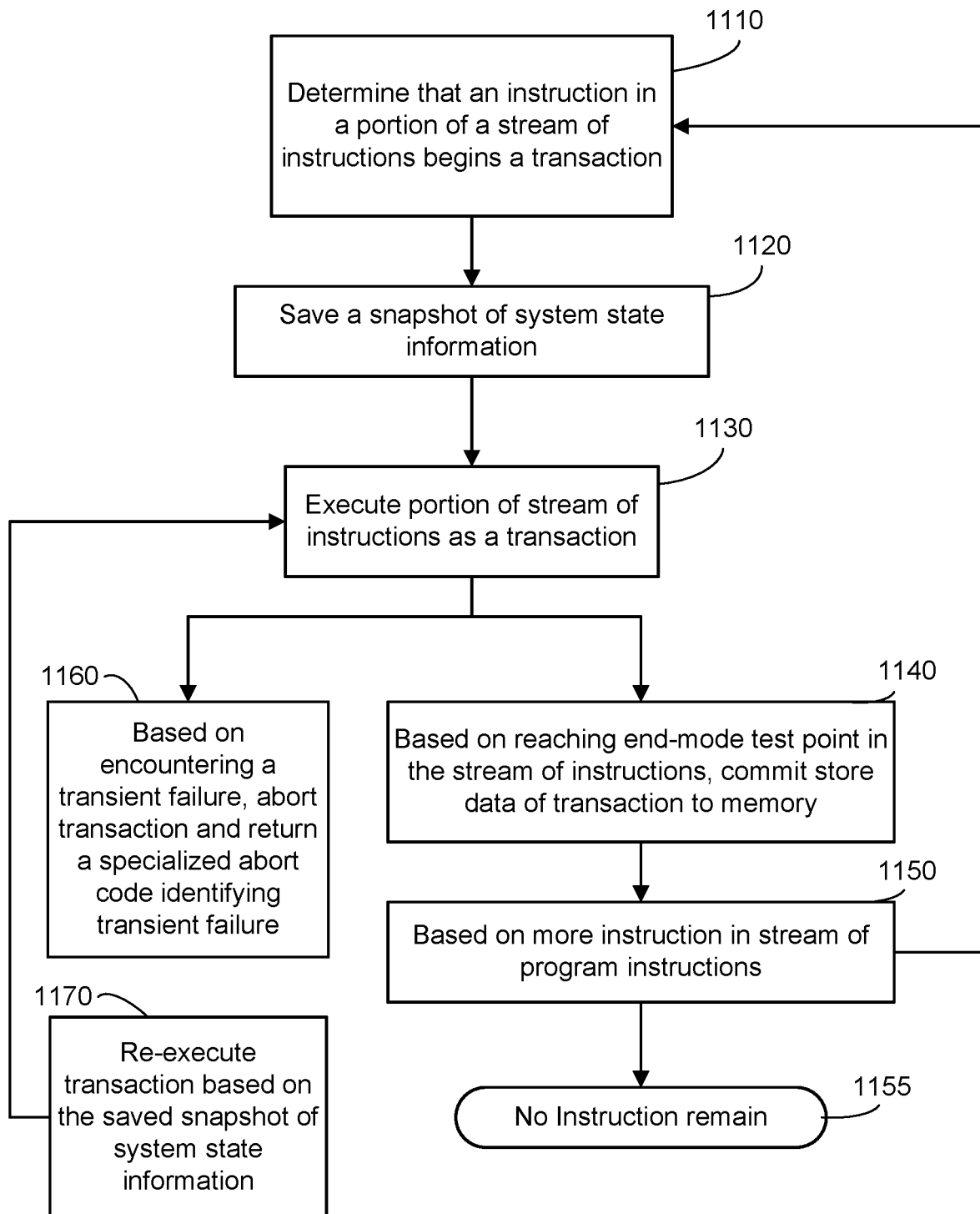
FIG. 10 depicts an exemplary flow for using transactional execution for reliability and recovery of transient failures.

Referring now to FIG. 10, in an embodiment of the disclosure, a computer system may execute each portion of a stream of program instructions as a transaction for reliability. The computer system may, at 1110, determine that an instruction in a portion of the stream of program instructions is to begin a transaction in transactional execution mode. The computer system may, at 1120, save a snapshot of a system state information and at 1130, execute the portion of the stream of program instructions as a transaction until an end-mode test point in the stream of program instruction is reached.

Based on reaching the end-mode test point in the stream of program instructions, the computer system may, at 1140, commit store data of the transaction to memory. Based on the stream of program instructions not being complete, the computer system, at 1150, may iterate to 1110 to automatically begin a new transaction in transactional execution mode of a next portion of the stream of program instructions. When no instructions remain in the stream of program instructions, the computer system may complete the program at 1155. Based on encountering a transient failure, the computer system may, at 1160, cause an abort and return a specialized abort code with the abort to identify the transient failure. For an aborted transaction, the computer system may, at 1170, re-execute the transaction based on the saved snapshot of the system state information. In another embodiment, the computer system may create a hardware interrupt providing failure mode information. The hardware interrupt may be handled by firmware or privileged software.

In an embodiment, the end-mode test point may be indicated by an execution of an end-mode test point instruction, the end-mode test point instruction causing one transaction to end and a next transaction to begin. In another embodiment, the end-mode test point may be based on an execution of an end-mode test point parameter instruction, the execution of the end-mode test point parameter instruction setting parameters used by the computer system to determine the end-mode test points in the stream of program instructions.

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although one or more examples have been provided herein, these are only examples. Many variations are possible without departing from the spirit of the present invention. For instance, processing environments other than the examples provided herein may include and/or benefit from one or more aspects of the present invention. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

As used herein, the term "obtaining" includes, but is not limited to, fetching, receiving, having, providing, being provided, creating, developing, etc.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for autonomous recovery from a transient hardware failure by executing each portion of a stream of program instructions as a transaction, the method comprising:
    creating, by an operating system on a multi-processor computer system configured to support transactional execution mode processing, a start of a transactional region portion of a stream of program instructions wherein the portion of the stream of program instructions in the transactional region is to be executed as a transaction in transactional execution mode;
    starting the transactional region in transactional execution mode on a first processor of the multi-processors;
    creating, by the operating system, an end of the transactional region portion of the stream of program instructions;
    in response to ending execution of the transactional region in transactional execution mode, committing, by the operating system, store data of a transaction to memory; and
    in response to a transient hardware failure affecting a program resource required by one or more instructions in the transactional region portion stream of program instructions executing as a transaction in transactional execution mode:
        aborting, by the operating system, the transaction without notifying a computer software application that initiated the stream of program instructions; and
        re-executing, by the operating system on a second processor of the multi-processors, the transactional region portion stream of program instructions as a transaction in transactional execution mode, based on a snapshot of a system state information.

2. The method according to claim 1, wherein responsive to a transient hardware failure affecting a program resource required by one or more instructions in the transactional region portion stream of program instructions executing as a transaction in transactional execution mode further comprises:
    returning, by the operating system, a specialized abort code with the abort identifying the transient hardware failure.

3. The method according to claim 1, wherein responsive to a transient hardware failure affecting a program resource required by one or more instructions in the transactional region portion stream of program instructions executing as a transaction in transactional execution mode further comprises:
    creating, by the operating system, a hardware interrupt that is handled by one of firmware or privileged software; and
    providing, by the operating system, failure information.

4. A method according to claim 1,
    wherein in response to starting the transactional region in transactional execution mode further comprises the step of:
        writing, by the operating system to a gathering store, data that is stored by one or more executed program instructions in the transactional region portion stream of program instructions; and
    wherein committing, by the operating system, store data of the transaction to memory further comprises:
        clearing the gathering store; and
    wherein aborting, by the operating system, the transaction without notifying a computer software application that initiated the stream of program instructions further comprises:
        clearing the gathering store.

5. A computer system for autonomous recovery from a transient hardware failure by executing each portion of a stream of program instructions as a transaction, the computer system comprising:
    a memory; and
    a processor in communication with the memory, wherein the computer system is configured to perform a method comprising:
        creating, by an operating system on a multi-processor computer system configured to support transactional execution mode processing, a start of a transactional region portion of a stream of program instructions wherein the portion of the stream of program instructions in the transactional region is to be executed as a transaction in transactional execution mode;
        starting the transactional region in transactional execution mode on a first processor of the multi-processors;
        creating, by the operating system, an end of the transactional region portion of the stream of program instructions;

in response to ending execution of the transactional region in transactional execution mode, committing, by the operating system, store data of a transaction to memory; and in response to a transient hardware failure affecting a program resource required by one or more instructions in the transactional region portion stream of program instructions executing as a transaction in transactional execution mode:

aborting, by the operating system, the transaction without notifying a computer software application that initiated the stream of program instructions; and re-executing, by the operating system on a second processor of the multi-processors, the transactional region portion stream of program instructions as a transaction in transactional execution mode, based on a snapshot of a system state information.

6. The computer system according to claim 5, wherein responsive to a transient hardware failure affecting a program resource required by one or more instructions in the transactional region portion stream of program instructions executing as a transaction in transactional execution mode further comprises:

returning, by the operating system, a specialized abort code with the abort identifying the transient hardware failure.

7. The computer system according to claim 5, wherein responsive to a transient hardware failure affecting a program resource required by one or more instructions in the transactional region portion stream of program instructions executing as a transaction in transactional execution mode further comprises:

creating, by the operating system, a hardware interrupt that is handled by one of firmware or privileged software; and providing, by the operating system, failure information.

8. A computer system according to claim 5, wherein in response to starting the transactional region in transactional execution mode further comprises the step of:

writing, by the operating system to a gathering store, data that is stored by one or more executed program instructions in the transactional region portion stream of program instructions; and wherein committing, by the operating system, store data of the transaction to memory further comprises:

clearing the gathering store; and wherein aborting, by the operating system, the transaction without notifying a computer software application that initiated the stream of program instructions further comprises:

clearing the gathering store.

9. A computer program product for autonomous recovery from a transient hardware failure by executing each portion of a stream of program instructions as a transaction, the computer program product comprising a computer readable storage medium having program instructions embodied therewith, wherein the computer readable storage medium is not a transitory signal per se, the program instructions executable by a computer to cause the computer to perform a method comprising:

creating, by an operating system on a multi-processor computer system configured to support transactional execution mode processing, a start of a transactional region portion of a stream of program instructions wherein the portion of the stream of program instructions in the transactional region is to be executed as a transaction in transactional execution mode;

starting the transactional region in transactional execution mode on a first processor of the multi-processors;

creating, by the operating system, an end of the transactional region portion of the stream of program instructions;

in response to ending execution of the transactional region in transactional execution mode, committing, by the operating system, store data of a transaction to memory; and in response to a transient hardware failure affecting a program resource required by one or more instructions in the transactional region portion stream of program instructions executing as a transaction in transactional execution mode:

aborting, by the operating system, the transaction without notifying a computer software application that initiated the stream of program instructions; and re-executing, by the operating system on a second processor of the multi-processors, the transactional region portion stream of program instructions as a transaction in transactional execution mode, based on a snapshot of a system state information.

10. The computer program product according to claim 9, wherein responsive to a transient hardware failure affecting a program resource required by one or more instructions in the transactional region portion stream of program instructions executing as a transaction in transactional execution mode further comprises:

returning, by the operating system, a specialized abort code with the abort identifying the transient hardware failure.

11. The computer program product according to claim 9, wherein responsive to a transient hardware failure affecting a program resource required by one or more instructions in the transactional region portion stream of program instructions executing as a transaction in transactional execution mode further comprises:

creating, by the operating system, a hardware interrupt that is handled by one of firmware or privileged software; and providing, by the operating system, failure information.

12. A computer program product according to claim 9, wherein in response to starting the transactional region in transactional execution mode further comprises the step of:

writing, by the operating system to a gathering store, data that is stored by one or more executed program instructions in the transactional region portion stream of program instructions; and wherein committing, by the operating system, store data of the transaction to memory further comprises:

clearing the gathering store; and wherein aborting, by the operating system, the transaction without notifying a computer software application that initiated the stream of program instructions further comprises:

clearing the gathering store.

* * * * *